(12) United States Patent
Rastogi et al.

(10) Patent No.: US 10,642,495 B2
(45) Date of Patent: *May 5, 2020

(54) WEAR LEVELING IN SOLID STATE DEVICES

(71) Applicant: WESTERN DIGITAL TECHNOLOGIES, INC., San Jose, CA (US)

(72) Inventors: Kanishk Rastogi, Maharashtra (IN); Sanoj Kizhakkekara Unnikrishnan, Bangalore (IN); Anand Mitra, Maharashtra (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/011,572

(22) Filed: Jun. 18, 2018

(65) Prior Publication Data
US 2018/0300062 A1 Oct. 18, 2018

Related U.S. Application Data

(63) Continuation of application No. 15/130,320, filed on Apr. 15, 2016, now Pat. No. 10,019,166, which is a (Continued)

(51) Int. Cl.
G06F 3/06 (2006.01)
G06F 12/02 (2006.01)

(52) U.S. Cl.
CPC ............ *G06F 3/0608* (2013.01); *G06F 3/064* (2013.01); *G06F 3/0616* (2013.01); (Continued)

(58) Field of Classification Search
None
See application file for complete search history.

(56) References Cited

U.S. PATENT DOCUMENTS 7,188,228 B1 3/2007 Chang et al.
7,948,798 B1 5/2011 Sheredy
(Continued)

OTHER PUBLICATIONS

Chung, et al. "A High-Performance Wear-Leveling Algorithm for Flash Memory System", IEICE Electronics Express, 3(24): 1874-1880, Dec. 28, 2012, 7 pages.
(Continued)

Primary Examiner — Kevin Verbrugge
(74) Attorney, Agent, or Firm — Morgan, Lewis & Bockius LLP

(57) ABSTRACT

Embodiments of the present disclosure provide a memory-efficient mechanism for identifying memory blocks with a low wear count. More particularly, embodiments of the present disclosure provide a mechanism for identifying a memory block whose wear count is within the bottom p % of all wear counts associated with memory blocks in a storage system. If a memory controller performs the garbage collection operation on a memory block whose wear count is within the bottom p % of all wear counts, then the memory controller is expected to utilize the remaining memory blocks (e.g., memory blocks whose wear count is within the upper (100–p) % of all wear counts) efficiently and level the wear count of at least the remaining memory blocks.

20 Claims, 5 Drawing Sheets

Related U.S. Application Data continuation of application No. 14/509,400, filed on Oct. 8, 2014, now Pat. No. 9,336,136.

(52) U.S. Cl.
CPC .......... *G06F 3/0652* (2013.01); *G06F 3/0658* (2013.01); *G06F 3/0679* (2013.01); *G06F 12/0246* (2013.01); *G06F 2212/1036* (2013.01); *G06F 2212/7205* (2013.01); *G06F 2212/7211* (2013.01)

(56) References Cited

U.S. PATENT DOCUMENTS

| | | |
|---|---|---|
| 8,001,318 B1 | 8/2011 | Iyer |
| 8,046,526 B2 | 10/2011 | Yeh |
| 8,065,469 B2 | 11/2011 | Mothilal |
| 8,478,930 B1 | 7/2013 | Syu |
| 8,489,966 B2 | 7/2013 | Schuette et al. |
| 8,578,088 B2 | 11/2013 | Rousseau |
| 8,612,804 B1 | 12/2013 | Kang et al. |
| 8,621,141 B2 | 12/2013 | Mudama et al. |
| 9,898,212 B1 | 2/2018 | Sheredy |
| 2010/0100663 A1 | 4/2010 | Kao et al. |
| 2011/0055458 A1 | 3/2011 | Kuehne |
| 2011/0258369 A1 | 10/2011 | Hsiao |
| 2011/0264847 A1 | 10/2011 | Hsiao |
| 2012/0054414 A1 | 3/2012 | Tsai et al. |
| 2013/0054878 A1 | 2/2013 | Lee et al. |
| 2013/0346812 A1 | 12/2013 | Bahirat et al. |

OTHER PUBLICATIONS

Murugan, et al., "Rejuvenator: A Static Wear Leveling Algorithm and NAND Flash Memory with Minimized Overhead", 27th Symposium on Mass Storage Systems and Technologies (MSST), May 23-27, 2011, Denver, Colorado, 12 pages.

WEAR LEVELING IN SOLID STATE DEVICES

CROSS-REFERENCE TO RELATED APPLICATIONS

This application is a continuation of U.S. application Ser. No. 15/130,320, titled "Wear Leveling in Solid State Devices," filed Apr. 15, 2016, now U.S. Pat. No. 10,019,166, which is a continuation of U.S. application Ser. No. 14/509,400, titled "Apparatus, Systems, and Methods for Providing Wear Leveling in Solid State Devices," filed Oct. 8, 2014, now U.S. Pat. No. 9,336,136, the entirety of each of which is incorporated herein by reference for all purposes.

BACKGROUND

Field of the Disclosure

The present disclosure relates to apparatus, systems, and methods for providing wear leveling in solid state devices.

Related Disclosure

Flash memory can include an improved form of Electrically-Erasable Programmable Read-Only Memory (EEPROM). Traditional EEPROM devices are only capable of erasing or writing one memory location (e.g., a memory cell) at a time. In contrast, flash memory allows multiple memory locations to be erased or written in one programming operation. Flash memory can thus operate at a higher speed compared to traditional EEPROM.

Flash memory, which can also be referred to as a flash memory device or a flash storage device, has a number of advantages over other storage devices. It generally offers faster read access times and better shock resistance than a hard disk drive (HDD). Unlike dynamic random access memory (DRAM), flash memory is non-volatile, meaning that data stored in flash memory is not lost when power to the memory is removed. These advantages, and others, may explain the increasing popularity of flash memory for storage applications in devices such as memory cards, USB flash drives, mobile phones, digital cameras, mass storage devices, MP3 players and the like.

Current flash storage devices suffer from a number of limitations. Although a flash memory device can be read or written at the physical page level, it can only be erased or rewritten at the block level, which includes multiple physical pages. For example, beginning with a pre-erased block, data can be written to any physical page within that block. However, once data has been written to a physical page, the contents of that physical page cannot be changed or removed until the entire block containing that physical page is erased. In other words, while flash memory can support random-access read and write operations, it cannot support random-access rewrite or erase operations.

SUMMARY

Embodiments of the present disclosure relate to apparatus, systems, and methods for providing wear leveling in solid state devices.

Some embodiments include a method. The method includes receiving, at a memory controller in a storage system coupled to a host device via an interface, a request to remove data in any one of a plurality of memory blocks in the storage system, selecting, by the memory controller, one of the memory blocks in the storage system, and determining, by the memory controller, a wear count associated with the selected memory block, wherein the wear count is indicative of a number of times the memory block has been erased. When the wear count associated with the selected memory block is less than a threshold wear count, the method includes causing, by the memory controller, data to be removed from the selected memory block. When the wear count associated with the selected memory block is not less than the threshold wear count, the method includes selecting, by the memory controller, another one of the memory blocks until the memory controller selects a memory block whose wear count is less than the threshold wear count.

In some embodiments, the method further includes maintaining a wear count table having a wear count element associated with a particular wear count, wherein the wear count element indicates a number of memory blocks having the particular wear count.

In some embodiments, the method further includes determining the threshold wear count based on the particular wear count associated with the wear count table.

In some embodiments, the particular wear count is indicative of an upper bound of a bottom p % of all wear counts associated with the plurality of memory blocks.

In some embodiments, the method further includes detecting a garbage collection operation performed on one of the plurality of memory blocks; and increasing, by one, a wear count associated with the one of the plurality of memory.

In some embodiments, the method further includes determining a first wear count element of the wear count table associated with a previous wear count of the one of the plurality of memory; determining a second wear count element of the wear count table associated with the wear count of the one of the plurality of memory; and when the first wear count element and the second wear count element are different, decreasing a value of the first wear count element by one and increasing a value of the second wear count element by one.

In some embodiments, wherein the request to remove data in any one of memory blocks in the storage system comprises a request to perform a garbage collection operation.

In some embodiments, wherein when the memory controller is unable to identify a memory block whose wear count is less than the threshold wear count after a fixed number of iterations, randomly selecting a memory block for the garbage collection operation.

Some embodiments include a storage system. The storage system can include one or more storage devices comprising a plurality of memory blocks for maintaining data. The storage system can also include a memory controller configured to process a request to remove data in any one of memory blocks in the storage system. The memory controller can be configured to select one of the memory blocks in the storage system, determine a wear count associated with the selected memory block, wherein the wear count is indicative of a number of times the memory block has been erased. When the wear count associated with the selected memory block is less than a threshold wear count, the memory controller can be configured to cause data to be removed from the selected memory block. When the wear count associated with the selected memory block is not less than the threshold wear count, the memory controller can be configured to select another one of the memory blocks until the memory controller selects a memory block whose wear count is less than the threshold wear count.

In some embodiments, the memory controller is configured to maintain a wear count table having a wear count element associated with a particular wear count, wherein the wear count element indicates a number of memory blocks having the particular wear count.

In some embodiments, the memory controller is configured to determine the threshold wear count based on the particular wear count associated with the wear count table.

In some embodiments, the particular wear count is indicative of a bottom p % of all wear counts associated with the plurality of memory blocks.

In some embodiments, the memory controller is configured to detect a garbage collection operation performed on one of the plurality of memory blocks; and increase, by one, a wear count associated with the one of the plurality of memory.

In some embodiments, the memory controller is configured to determine a first wear count element of the wear count table associated with a previous wear count of the one of the plurality of memory; determine a second wear count element of the wear count table associated with the wear count of the one of the plurality of memory; and when the first wear count element and the second wear count element are different, decrease a value of the first wear count element by one and increasing a value of the second wear count element by one.

In some embodiments, the request to remove data in any one of memory blocks in the storage system comprises a request to perform a garbage collection operation.

In some embodiments, when the memory controller is unable to identify a memory block whose wear count is less than the threshold wear count after a fixed number of iterations, the memory controller is configured to randomly select a memory block for the garbage collection operation.

Some embodiments include a non-transitory computer readable medium having executable instructions. The executable instructions can be operable to cause a memory controller in a storage system to receive a request to remove data in any one of memory blocks in the storage system; select one of the memory blocks in the storage system; and determine a wear count associated with the selected memory block, wherein the wear count is indicative of a number of times the memory block has been erased. When the wear count associated with the selected memory block is less than a threshold wear count, the executable instructions can be operable to cause a memory controller to cause data to be removed from the selected memory block. When the wear count associated with the selected memory block is not less than the threshold wear count, the executable instructions can be operable to cause a memory controller to select another one of the memory blocks until the memory controller selects a memory block whose wear count is less than the threshold wear count.

In some embodiments, the non-transitory computer readable medium further includes executable instructions operable to cause the memory controller to maintain a wear count table having a wear count element associated with a particular wear count, wherein the wear count element indicates a number of memory blocks having the particular wear count.

In some embodiments, the non-transitory computer readable medium further includes executable instructions operable to cause the memory controller to determine the threshold wear count based on the particular wear count associated with the wear count table.

BRIEF DESCRIPTION OF THE FIGURES

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labeled in every figure. Nor is every component of each embodiment of the disclosed subject matter shown where illustration is not necessary to allow those of ordinary skill in the art to understand the disclosed subject matter.

DETAILED DESCRIPTION

Figure 1:
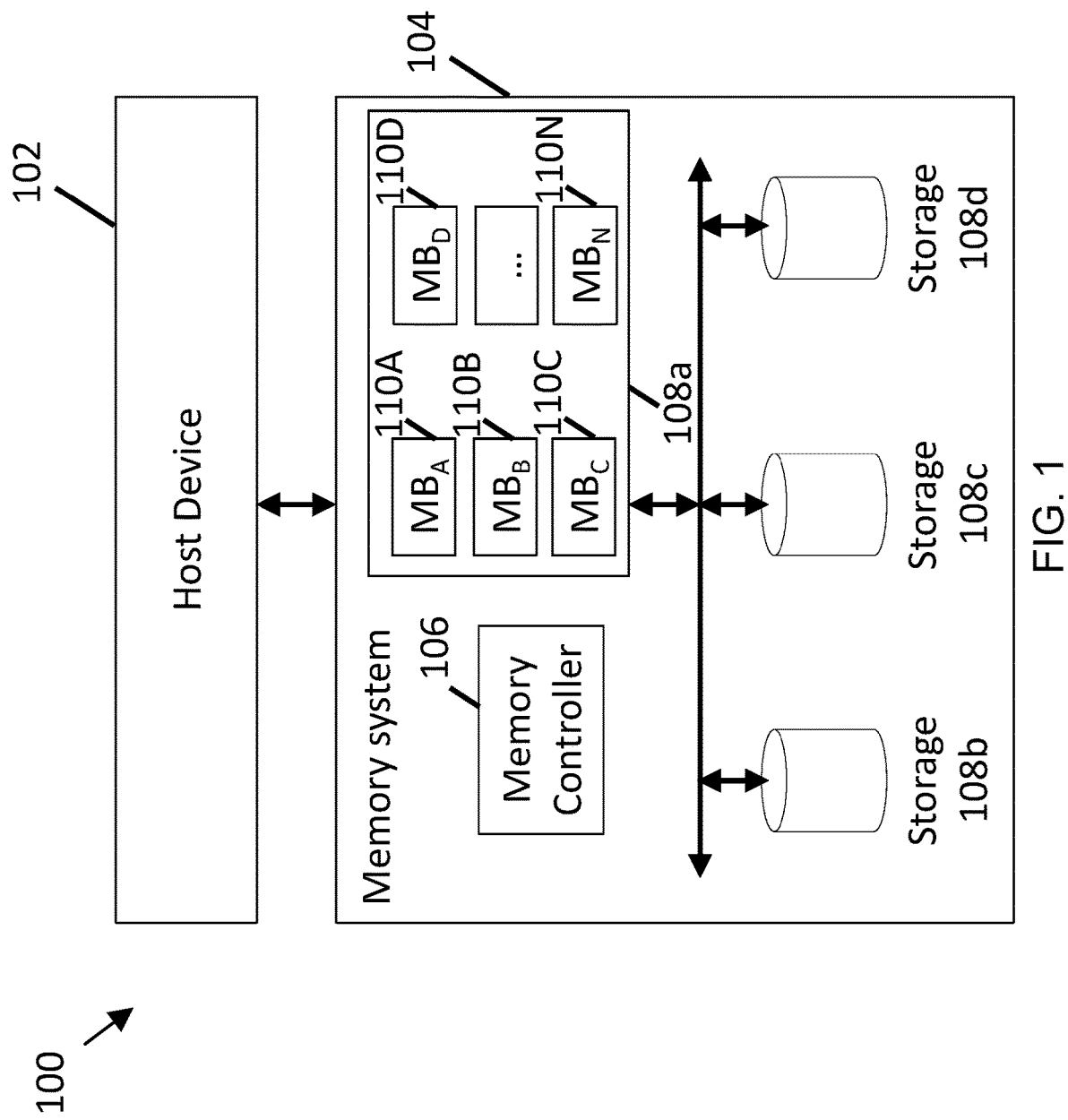
FIG. 1 illustrates an exemplary computing system 106 having a storage system in accordance with some embodiments of the present disclosure.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Data can be written to a flash memory device in a unit called a page, which may include multiple memory cells. However, due to physical characteristics of a flash memory device, data stored in the flash memory device can only be erased in larger units called blocks, which may include multiple pages.

When data stored in a page is no longer needed—also referred to as a stale page—a flash memory controller that manages the flash memory can perform a garbage collection (GC) operation, which involves erasing data from a block that includes the stale page. During GC, the flash memory controller can first retrieve valid data from pages in that block and re-write the retrieved valid data into another empty memory block. Subsequently, the flash memory controller can erase the data from the block, and use the erased block for storing new data.

The problem with the GC is that flash memory cells can only be programmed and erased a limited number of times. The maximum number of program/erase cycles that a flash memory cell can sustain is referred to as a P/E cycle. The P/E cycle of single-level cell (SLC) flash memory, designed for high performance and longer endurance, can typically be between 50,000 and 106,000 cycles. On the other hand, the P/E cycle of multi-level cell (MLC) flash memory, which is designed for lower cost applications, is typically between 3,000 and 5,000. The P/E cycle can be indicative of a lifetime of the flash memory cell. Therefore, a flash memory controller is often designed to perform the GC operation in such a way that all flash memory cells are as evenly used as possible.

To this end, a flash memory controller can maintain a wear count for each memory block in a storage system. The wear count can indicate the number of erasures that have been performed on the memory block. Therefore, the flash memory controller can perform the GC operation to level the wear count across memory blocks in a storage system. For example, the controller can attempt to write data to physical pages in a memory block with a lower wear count, or the controller can attempt to free-up (e.g., erase) memory blocks with a lower wear count.

Unfortunately, existing techniques for identifying memory blocks with a lower wear count can consume a large amount of memory because they often use special data structures to order the memory blocks based on the associated wear counts. For example, existing techniques may use a double linked list to order memory blocks based on the associated wear counts so that the last node in the double linked list corresponds to the memory block with the lowest wear count. However, maintaining a double linked list can consume a large amount of memory, especially when a storage system maintains a large number of memory blocks.

Embodiments of the present disclosure provides a memory-efficient mechanism for identifying memory blocks with a low wear count. More particularly, embodiments of the present disclosure provides a mechanism for identifying a memory block whose wear count is within the bottom p % of all wear counts associated with memory blocks in a storage system. If a memory controller always performs the GC operation on a memory block whose wear count is within the bottom p % of all wear counts, then the memory controller is expected to utilize the remaining memory blocks (e.g., memory blocks whose wear count is within the upper (100−p) % of all wear counts) efficiently and level the wear count of at least the remaining memory blocks. In fact, in some embodiments, the difference in the wear counts between the remaining memory blocks can be as low as one.

In some embodiments, the memory controller is configured to maintain a table that indicates the threshold wear count representing the upper bound of the bottom p % of all wear counts. This table can be updated when a GC operation is performed so that the table accurately reflects the threshold wear count.

When the memory controller receives a request to free-up a memory block (e.g., perform a GC operation), the memory controller can select a memory block whose wear count is within the bottom p % of all wear counts. To this end, the memory controller can randomly select a memory block, and determine a wear count associated with the selected memory block. If the determined wear count is less than or equal to the threshold wear count representing the upper bound of the bottom p % of all wear counts, then the memory controller can perform the GC operation on the selected memory block. If the determined wear count is greater than the threshold wear count, then the memory controller can select another memory block and iterate this process until the memory controller identifies a memory block whose wear count is less than or equal to the threshold wear count. In some embodiments, the memory controller can be configured to limit the number of iterations for identifying this memory block. This way, the memory controller does not stall the GC operation indefinitely, especially when the value of p is low. In some embodiments, when the memory controller fails to identify a memory block within the number of iterations, the memory controller can randomly select a memory block for the garbage collection.

FIG. 1 illustrates an exemplary computing system 106 having a storage system in accordance with some embodiments of the present disclosure. The computing system 106 can include a host device 102 and a storage system 104, where the storage system 104 includes a memory controller 106 and one or more storage devices 108a-108d. Each storage device 108 can include a plurality of memory blocks 110A-110N for maintaining data. Each of the memory blocks 110 can have a fixed size. For example, a memory block 110 can be 128 KB long. Each memory block 110 can be divided into a plurality of pages. Each page in the memory block 110 can have a fixed size. For example, a page can be 4 KB long.

The host device 102 can include any computer system that uses and accesses a storage system 104 for data read and data write operations. Such a host device 102 may run applications such as databases, file systems, and web services. In some embodiments, the host device 102 can be physically co-located with (e.g., located physically close to) the storage system 104. In such embodiments, the host device 102 can be configured to communicate with the storage system 104 via a bus. The bus can include, for example, PCI, PCI-Express, PCI-X, InfiniBand, Hyper-Transport, SCSI PCI-E card, SATA PCI-E card, iSCSI adaptor card, and Fibre Channel PCI-E card. In other embodiments, the host device 102 can be physically separated from the storage system 104. In such embodiments, the host device 102 can communicate with the storage system 104 via a communication network. The network can include the Internet, a local area network (LAN), a packet data network, a legacy network, or any type of network that is capable of providing data communication between the host device 102 and the storage system 104.

In some embodiments, a memory controller 106 is implemented in hardware. The hardware can include logic circuits and/or memory for selecting target memory blocks and for evicting data from the selected target memory blocks to accommodate new data. In some embodiments, the hardware for the memory controller 106 can be implemented using a hardware description language including Verilog, VHSIC hardware description language (VHDL), and BlueSpec™ (Bluespec Inc., Framingham, Mass.), and be synthesized using logic synthesis tools including Design Compiler® (Synopsis Inc., Mountain View, Calif.), Encounter RTL compiler (Cadence Design Systems Inc., San Jose, Calif.), RealTime Designer (Oasys Design Systems, Inc., Santa Clara, Calif.), and BooleDozer (International Business Machine, Endicott, N.Y.).

In some embodiments, a memory controller 106 is implemented as a part of firmware. As discussed further below, the firmware can allocate a memory space for maintaining a wear count table and a wear count map, and can further include instructions operable to identify a memory block for a GC operation.

In some embodiments, the memory controller 106 can be implemented in software using memory such as a non-transitory computer readable medium, a programmable read only memory (PROM), or flash memory. The software can run on a processor, which may reside in the memory controller 106, which executes instructions or computer code, which can be embodied in a non-transitory computer readable medium embodied in the memory controller 106.

In some embodiments, the storage device 108 can be implemented using hard disk drives (HDDs). In other embodiments, the storage device 108 can also be implemented using nonvolatile RAM (NVRAM), a micro-electromechanical systems (MEMS) storage, or a battery backed dynamic random access memory (DRAM).

In some embodiments, the memory controller 106 can receive a request to perform a GC operation to free-up a memory block 110 for a new set of data. To this end, the memory controller 106 is configured to select a memory block 110 for the GC operation. To level the wear counts amongst the memory blocks 110 in the storage system 104, the memory controller 106 can be configured to select a memory block 110 whose wear count is lower compared to other memory blocks. More particularly, the memory controller 106 can be configured to select a memory block 110 whose wear count is within the bottom p % of all wear counts.

To identify a memory block 110 whose wear count is within the bottom p % of all wear counts, the memory controller 106 can be configured to maintain a wear count map. The wear count map can include a plurality of wear count values, each of which indicates a wear count value for one of the memory blocks 110 in the storage system. The memory controller 106 can also maintain a wear count table. The wear count table can indicate a number of memory blocks associated with a particular wear count or a particular range of wear counts.

Figure 2:
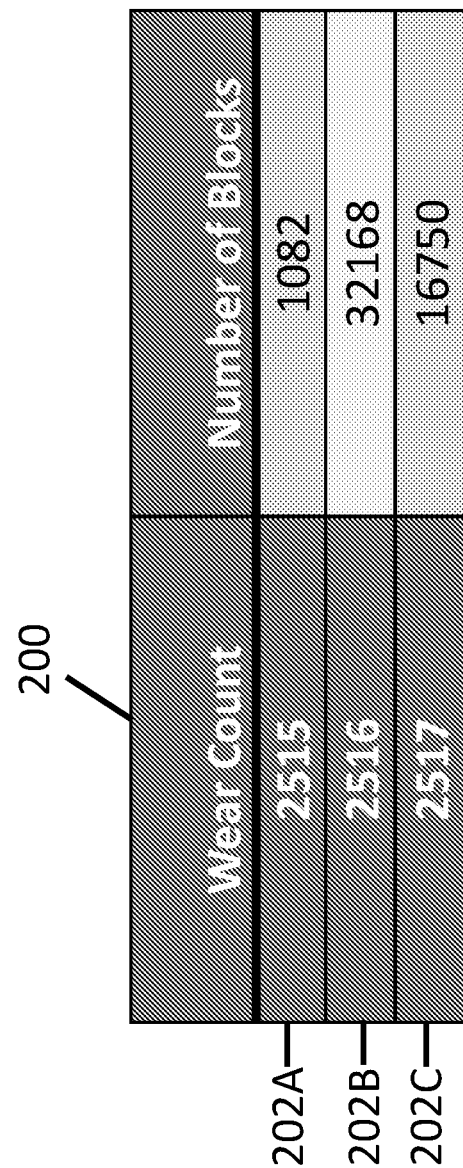
FIG. 2 illustrates a wear count table in accordance with some embodiments.

FIG. 2 illustrates a wear count table in accordance with some embodiments. FIG. 2 illustrates an exemplary scenario in which the total number of memory blocks in the storage system 104 is 50,000, and all memory blocks have a wear count between 2515 and 2517. The table 200 includes three wear count elements 202A-202C, which are associated with 2515, 2516, and 2517, respectively. The memory controller 106 can be configured to use this wear count table 200 to determine a threshold wear count that represents the upper bound of the bottom p % of all wear counts. For example, in FIG. 2, since the storage system 104 includes 50,000 memory blocks, the memory controller 106 can determine that the wear count 2515 is the upper bound of the bottom 1% of all wear counts.

In some embodiments, the table 200 can also include a cumulative distribution function (CDF) of the wear counts. The CDF can describe the probability with which a memory block with a wear count that is less than or equal to a particular wear count can be found. The CDF can be indicative of the threshold wear count that represents the upper bound of the bottom p % of all wear counts.

In some embodiments, other types of data structures can be used to represent the information in the wear count table. For example, the information can be represented using an array, a linked list, or any other types of data structures that can maintain an association between a wear count and the number of memory blocks having the associated wear count.

Figure 3:
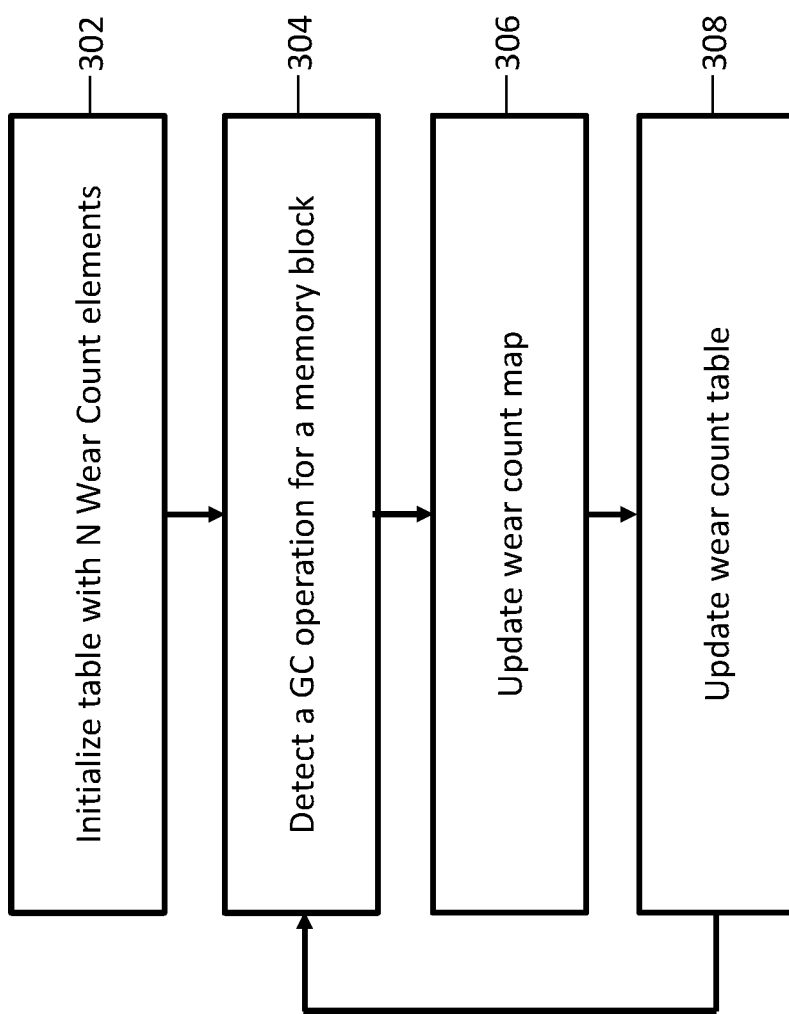
FIG. 3 illustrates a process of updating and maintaining a wear count table in accordance with some embodiments.

The memory controller 106 can be configured to update the wear count table 200 so that the table 200 can accurately reflect the threshold wear count. FIG. 3 illustrates a process of updating and maintaining a wear count table in accordance with some embodiments.

In step 302, the memory controller 106 can initialize the wear count table 200. The wear count table 200 can include N wear count elements (e.g., N rows), each associated with a particular wear count or a particular range of wear counts. The memory controller 106 can set values corresponding to the N wear count elements. The values corresponding to the N wear count elements can be the number of memory blocks having the wear count associated with the wear count element.

In step 304, the memory controller 106 can detect a GC operation for a memory block 110 in the storage system 104. When the memory controller 106 detects a GC operation, the memory controller 106 can proceed to step 306. Until the memory controller 106 detects a GC operation, the memory controller 106 can remain in step 304.

In step 306, the memory controller 106 can update the wear count map to reflect the detected GC operation. For example, the memory controller 106 can increase, by one, the wear count associated with the memory block stored in the wear count map. This way, the wear count map reflects the current wear count associated with the memory block.

In step 308, the memory controller 106 can update the wear count table to reflect the detected GC operation. To this end, the memory controller 106 can (1) determine a first wear count element in the wear count table 200 corresponding to the previous wear count of the memory block and (2) determine a second wear count element in the wear count table 200 corresponding to the current wear count of the memory block.

If the first wear count element and the second wear count element are the same (e.g., the previous wear count was 100; the current wear count is 101; and a single wear count element in the wear count table 200 corresponds to wear counts between 50 and 150,) then the memory controller 106 can revert back to step 304 without updating the wear count table.

If the first wear count element and the second wear count element are different, then the memory controller 106 can decrease, by one, the value associated with the first wear count element, and increase, by one, the value associated with the second wear count element. This way, the wear count table 200 can accurately reflect the distribution of wear counts amongst the memory blocks 110.

In some embodiments, when a wear count element corresponding to the smallest wear count is associated with less than p % of memory blocks, then the memory controller 106 can merge that wear count element with the next-smallest wear count element. For example, referring back to FIG. 2, when p=5, then the number of memory blocks corresponding the smallest wear count element 202A is less than p % of the memory blocks. In this case, the memory controller 106 can merge the smallest wear count element 202A with another wear count element 202B corresponding to the next smallest wear count (or the next smallest range of wear counts.) When the wear count table 200 is T, and the wear count elements in the table T is identified using an index i, i=0 . . . 2, then the merging operation can be represented using the following pseudo code:

```
If T[0] is associated with less than p% of memory blocks:
    T[0] = T[0] + T[1];
    T[1] = T[2];
End
```

When the memory controller 106 receives a GC operation request, the memory controller 106 can select a memory block that is associated with a wear count within the bottom p % of all wear counts. This way, the memory controller 106 can level the wear across memory blocks.

Figure 4:
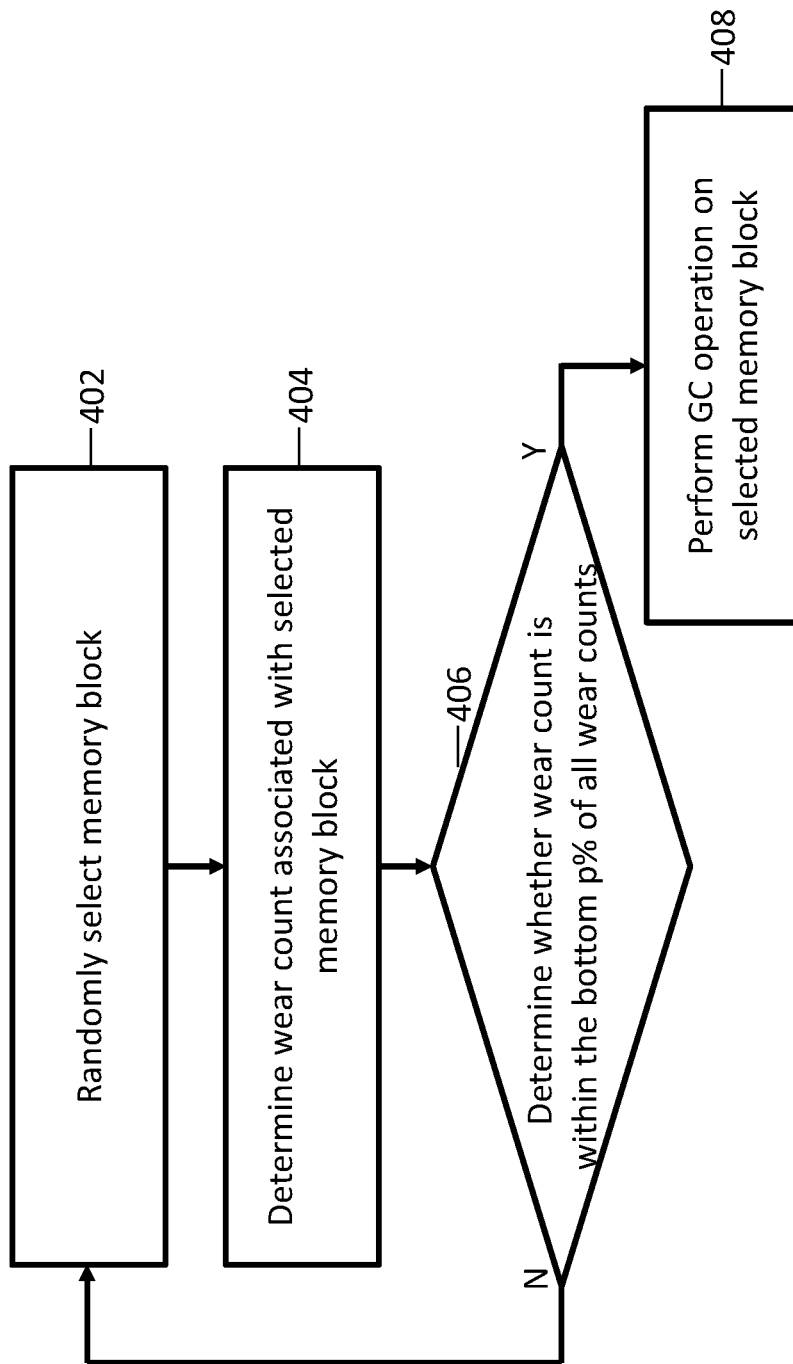
FIG. 4 illustrates a process for selecting a memory block for a garbage collection operation in accordance with some embodiments.

FIG. 4 illustrates a process for selecting a memory block for a GC operation in accordance with some embodiments. In step 402, the memory controller 106 can select a memory block 110 amongst the memory blocks in the storage system 104. In step 404, the memory controller 106 can determine the wear count associated with the selected memory block.

In some embodiments, the memory controller 106 can determine the wear count by retrieving the wear count associated with the selected memory block from a wear count map.

In step 406, the memory controller 106 can determine whether the wear count of the selected memory block is within the bottom p % of all wear counts. In some embodiments, the memory controller 106 can make this determination by determining whether the wear count of the selected memory block is associated with the smallest wear count element (e.g., a wear count element corresponding to the smallest wear count) in the wear count table 200.

When the wear count of the selected memory block is within the bottom p % of all wear counts, the memory controller 106 can move to step 408 and perform a GC operation on the selected memory block. When the wear count of the selected memory block is not within the bottom p % of all wear counts, then the memory controller 106 can move to step 402 and iterate steps 402-406 until the memory controller 106 identifies a memory block whose the wear count is within the bottom p % of all wear counts. This way, the memory controller 106 can wear-level memory blocks having a wear count in the upper (100–p) % of all wear counts.

In some embodiments, the memory controller can be configured to limit the number of iterations for identifying a memory block whose the wear count is within the bottom p % of all wear counts. This way, the memory controller does not stall the GC operation indefinitely, especially when the value of p is low. In some embodiments, when the memory controller fails to identify a memory block within the number of iterations, the memory controller can randomly select a memory block for the garbage collection.

When the value of p is small, then a large portion of memory blocks can be wear-leveled since memory blocks having a wear count in the upper (100–p) % are wear-leveled. However, a small value of p would likely increase the number of iterations needed to identify a memory block whose the wear count is within the bottom p % of all wear counts. Therefore, p is an important parameter for the operation of the disclosed wear-leveling technique. In some embodiments, p can be equal to 1.

Figure 5:
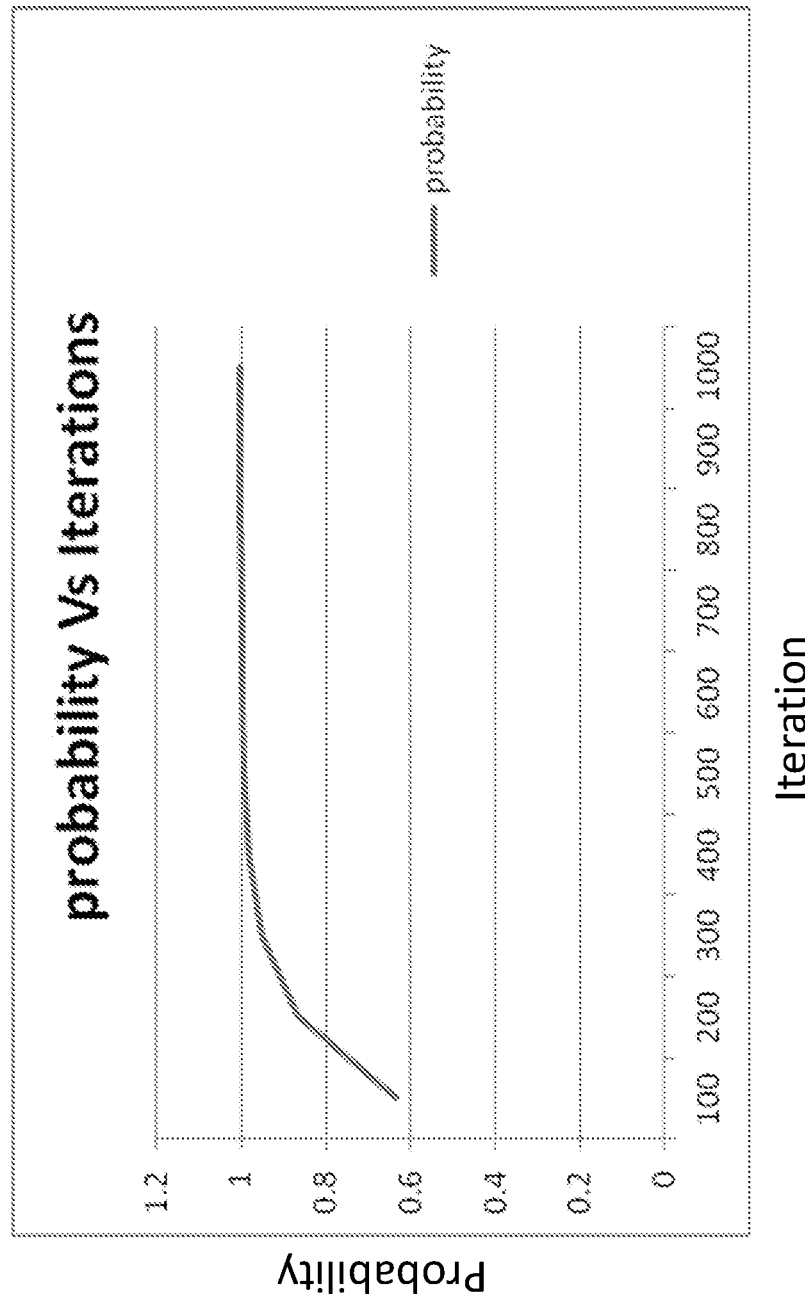
FIG. 5 illustrates a probability of identifying a memory block in accordance with some embodiments.

FIG. 5 illustrates a probability of identifying a memory block having a wear count within the bottom p % of all wear counts in accordance with some embodiments. This figure illustrates a scenario in which the storage system 104 includes 256 Tera-Bytes of memory, each memory block includes 128 Kilo-Bytes of memory, and p=1. The probability of identifying a memory block having a wear count within the bottom p % of all wear counts increases as a function of iteration. The probability of identifying the memory block is greater than 99% when the memory controller 106 iterates for more than 500 iterations.

A memory block selected for a GC operation may still maintain valid pages. In order to perform a GC operation on such a memory block, the memory controller 106 should retrieve the valid pages and store the retrieved pages in a new memory block. Because the memory controller 106 is unnecessarily moving valid pages between memory blocks, the memory controller 106 is in effect performing unnecessary write operations. Such unnecessary write operations are often characterized as write amplification.

To reduce write amplification, the memory controller 106 can be configured to select a memory block that has less number of valid pages. To this end, the memory controller 106 can be configured to reduce the wear count of a memory block by a downgrade step M when the number of invalid pages in the memory block is large. The downgrade step M can be any positive integer. This way, the memory controller 106 is steered to select a memory block that has a large number of invalid pages, in addition to having a wear count that is smaller compared to other memory blocks. When this memory block is selected for the GC operation, the memory controller 106 can increase the wear count of this memory block by (1+M). In some embodiments, the value of the downgrade step M can depend on the number of invalid pages in the memory block.

Where reference is made herein to a method comprising two or more defined steps, the defined steps can be carried out in any order or simultaneously (except where the context would indicate otherwise), and the method can include one or more other steps which are carried out before any of the defined steps, between two of the defined steps, or after all the defined steps (except where the context would indicate otherwise).

Those of skill in the art would appreciate that various illustrations described herein may be implemented as electronic hardware, computer software, firmware, or combinations of two or more of electronic hardware, computer software, and firmware. To illustrate this interchangeability of hardware, software, and/or firmware, various illustrative blocks, modules, elements, components, methods, and algorithms have been described above generally in terms of their functionality. Whether such functionality is implemented as hardware, software, firmware, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology. An implementation of the disclosed subject matter can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The disclosed subject matter can also be embedded in a computer program product, which comprises all the features enabling the implementation of the methods and systems described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, the systems and methods described herein may also be embodied in other specific forms without departing from the spirit or essential attributes thereof, and accordingly, reference should be had to the following claims, rather than to the foregoing specification, as indicating the scope of the systems and methods.

The present disclosure has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A method comprising:
receiving, at a memory controller in a storage system, a request to delete data from the storage system;
determining a wear count value associated with a memory block among a plurality of memory blocks of the storage system;
determining whether the wear count value associated with the memory block satisfies a threshold wear count value; and
in response to determining that the wear count value associated with the memory block satisfies the threshold wear count value:
causing, by the memory controller, deletion of data from the memory block.

2. The method of claim 1, further comprising
in response to determining that the wear count value associated with the memory block does not satisfy the threshold wear count value:
selecting a second memory block from the plurality of memory blocks of the storage system;
determining, by the memory controller, whether a wear count value associated with the second memory block satisfies the threshold wear count value; and
in response to determining that the wear count value associated with the second memory block satisfies the threshold wear count value,
causing, by the memory controller, deletion of data from the second memory block.

3. The method of claim 1, further comprising:
in response to determining that the wear count value associated with the memory block does not satisfy the threshold wear count value:
determining, by the memory controller, whether a counter satisfies a threshold number of attempts to identify a memory block associated with a wear count value that satisfies the threshold wear count value;
in response to determining that the counter satisfies the threshold number of attempts:
selecting randomly, by the memory controller, a second memory block from the plurality of memory blocks of the storage system; and
causing, by the memory controller, deletion of data from the second memory block.

4. The method of claim 1, further comprising:
updating the wear count value associated with the memory block to an updated wear count value.

5. The method of claim 4, further comprising:
updating, by the memory controller, the wear count value associated with the memory block to the updated wear count value by increasing the wear count value.

6. The method of claim 4, further comprising:
identifying, by the memory controller, based on the wear count value, a first wear count element in a data structure;
identifying, by the memory controller, based on the updated wear count value, a second wear count element in the data structure;
determining, by the memory controller, whether the first wear count element and the second wear count element are different; and in response to determining that the first wear count element and the second wear count element are different:
updating, by the memory controller, based on the updated wear count value, the data structure.

7. The method of claim 6, wherein the first wear count element is associated with a first range of wear count values and a first number of memory blocks among the plurality of memory blocks of the storage system, and wherein the second wear count element is associated with a second range of wear count values and a second number of memory blocks among the plurality of memory blocks of the storage system.

8. The method of claim 7, wherein the wear count value is within the first range of wear count values, and the updated wear count value is within the second range of wear count values.

9. The method of claim 7, further comprising:
updating the data structure by decreasing the first number of memory blocks associated with the first wear count element, and increasing the second number of memory blocks associated with the second wear count element.

10. A storage system comprising:
a plurality of memory blocks; and
a memory controller;
wherein the memory controller is configured to:
receive a request to delete data from the storage system;
determine a wear count value associated with a memory block among a plurality of memory blocks of the storage system;
determine whether the wear count value associated with the memory block satisfies a threshold wear count value; and
when the wear count value is determined to be associated with the memory block satisfies the threshold wear count value,
update the wear count value associated with the memory block to an updated wear count value, and
cause deletion of data from the memory block.

11. The storage system of claim 10, wherein the memory controller is configured to:
in response to determining that the wear count value associated with the memory block does not satisfy the threshold wear count value:
select a second memory block from the plurality of memory blocks;
determine whether a wear count value associated with the second memory block satisfies the threshold wear count value; and
in response to determining that the wear count value associated with the second memory block satisfies the threshold wear count value:
cause deletion of data from the second memory block.

12. The storage system of claim 10, wherein the memory controller is configured to:
in response to determining that the wear count value associated with the memory block does not satisfy the threshold wear count value:
determine whether a counter satisfies a threshold number of attempts to identify a memory block associated with a wear count value that satisfies the threshold wear count value; and
in response to determining that the counter satisfies the threshold number of attempts:

select a second memory block from the plurality of memory blocks; and cause deletion of data from the second memory block.

13. The storage system of claim 10, wherein the memory controller is configured to increase the wear count value to update the wear count value to the updated wear count value.

14. The storage system of claim 10, wherein the memory controller is configured to:

identify, based on the wear count value, a first wear count element in a data structure;

identify, based on the updated wear count value, a second wear count element in the data structure;

determine whether the first wear count element and the second wear count element are different; and in response to determining that the first wear count element and the second wear count element are different, update the data structure.

15. The storage system of claim 14, wherein the first wear count element is associated with a first one or more wear count values and a first number of memory blocks among the plurality of memory blocks of the storage system, and wherein the second wear count element is associated with a second one or more wear count values and a second number of memory blocks among the plurality of memory blocks.

16. The storage system of claim 15, wherein the wear count value is one of the first one or more wear count values, and the updated wear count value is one of the second one or more wear count values.

17. The storage system of claim 15, wherein the memory controller is configured to:

decrease the first number of memory blocks associated with the first wear count element, and increase the second number of memory blocks associated with the second wear count element, to update the data structure.

18. A system comprising:

means for receiving a request to delete data from a storage system;

means for determining a wear count value associated with a memory block among a plurality of memory blocks of the storage system;

means for determining whether the wear count value associated with the memory block satisfies a threshold wear count value;

in response to determining that the wear count value associated with the memory block satisfies the threshold wear count value:

means for updating the wear count value associated with the memory block to an updated wear count value by increasing the wear count value; and means for causing deletion of data from the memory block.

19. The system of claim 18, further comprising:

in response to determining that the wear count value associated with the memory block does not satisfy the threshold wear count value:

means for determining whether a counter satisfies a threshold number of attempts to identify a memory block associated with a wear count value that satisfies the threshold wear count value; and in response to determining that the counter satisfies the threshold number of attempts:

means for selecting randomly a second memory block from the plurality of memory blocks of the storage system; and means for causing deletion of data from the second memory block.

20. A non-transitory machine-readable medium including machine-executable instructions thereon that, when executed by a processor, perform a method comprising:

receiving a request to delete data from a storage system;

determining a wear count value associated with a memory block among a plurality of memory blocks of the storage system;

determining whether the wear count value associated with the memory block satisfies a threshold wear count value; and in response to determining that the wear count value associated with the memory block satisfies the threshold wear count value:

causing deletion of data from the memory block;

in response to determining that the wear count value associated with the memory block does not satisfy the threshold wear count value:

determining whether a counter satisfies a threshold number of attempts to identify a memory block associated with a wear count that satisfies the threshold wear count value; and in response to determining that the counter satisfies the threshold number of attempts:

selecting randomly a second memory block from the plurality of memory blocks of the storage system; and causing deletion of data from the second memory block.

* * * * *